United States Patent
Desai et al.

(10) Patent No.: US 7,254,141 B1
(45) Date of Patent: Aug. 7, 2007

(54) METHOD, SYSTEM AND STORAGE MEDIUM FOR ALLOCATING BANDWIDTH IN A COMMUNICATION NETWORK

(75) Inventors: Premal D. Desai, San Jose, CA (US);
Neeraj Gulati, Cupertino, CA (US);
Ted Tedijanto, Cupertino, CA (US);
Rakesh Sinha, Eatontown, NJ (US)

(73) Assignee: Ciena Corp., Linthicum, MD (US)

( * ) Notice: Subject to any disclaimer, the term of this patent is extended or adjusted under 35 U.S.C. 154(b) by 1042 days.

(21) Appl. No.: 10/266,865

(22) Filed: Oct. 8, 2002

Related U.S. Application Data (60) Provisional application No. 60/392,595, filed on Jun. 28, 2002.

(51) Int. Cl.
*H04L 12/56* (2006.01)

(52) U.S. Cl. ...................... 370/468; 370/444

(58) Field of Classification Search ............... 370/229, 370/231, 232, 235, 299, 360, 359, 352, 395.2, 370/395.21, 395.41, 400, 412, 444, 351, 370/462, 442, 347, 401
See application file for complete search history.

(56) References Cited

U.S. PATENT DOCUMENTS

| | | | | |
|---|---|---|---|---|
| 4,962,497 A | * | 10/1990 | Ferenc et al. ............... | 370/354 |
| 5,748,629 A | * | 5/1998 | Caldara et al. ............. | 370/389 |
| 5,777,986 A | * | 7/1998 | Grossman ................... | 370/235 |
| 5,825,766 A | * | 10/1998 | Kobayashi et al. .... | 370/395.64 |
| 6,343,075 B1 | | 1/2002 | Klausmeier et al. ........ | 370/388 |
| 6,400,681 B1 | | 6/2002 | Bertin et al. ................ | 370/218 |
| 7,012,892 B1 | * | 3/2006 | McAllister et al. ......... | 370/231 |

FOREIGN PATENT DOCUMENTS

WO   0052890   9/2000

* cited by examiner

*Primary Examiner*—Dang T. Ton
*Assistant Examiner*—Lawrence J Burrowes
(74) *Attorney, Agent, or Firm*—Merek, Blackmon & Voorhees, LLC (57) ABSTRACT

A method and system for allocating bandwidth in an optical communication system. During a set-up phase, a set-up message including requesting a connection is generated and includes a requested priority and requested bandwidth. When a switch receives the set-up message, the switch determines whether the available priority bandwidth for the requested priority exceeds the requested bandwidth. If the available priority bandwidth for the requested priority exceeds the requested bandwidth, the switch creates a provisional connectional which is committed to an actual connection in a subsequent connect phase. If the available priority bandwidth for the requested priority does not exceed the requested bandwidth, then the switch rejects the connection to provide a fast release.

30 Claims, 7 Drawing Sheets

Prior Art

METHOD, SYSTEM AND STORAGE MEDIUM FOR ALLOCATING BANDWIDTH IN A COMMUNICATION NETWORK

CROSS-REFERENCE TO RELATED APPLICATIONS

This application claims the benefit of U.S. provisional patent application Ser. No. 60/392,595 filed Jun. 28, 2002, the entire contents of which are incorporated herein by reference.

BACKGROUND OF THE INVENTION

1. Field of Invention

This invention relates to a method and system for allocating bandwidth in a communication network.

2. Description of Related Art

Figure 1:
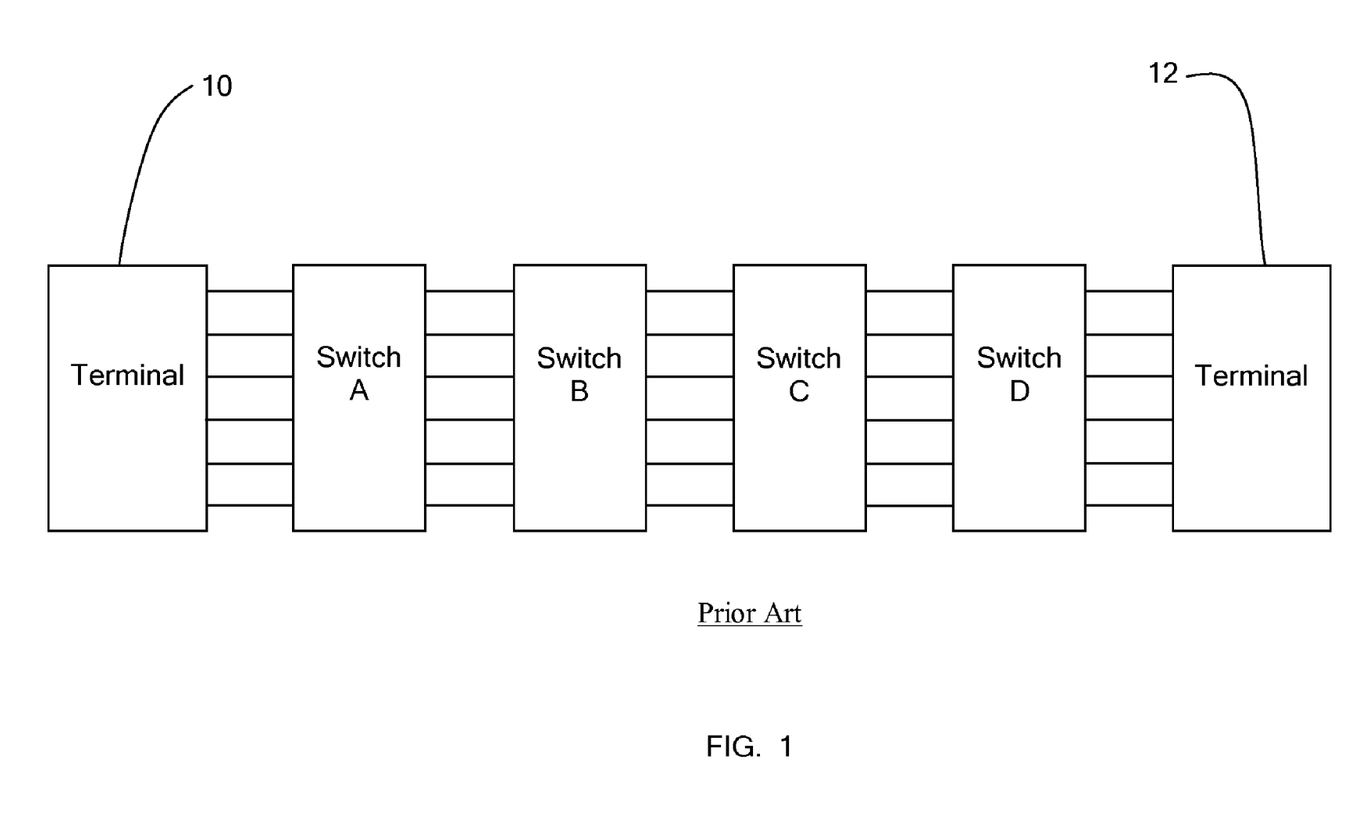
FIG. 1 is a block diagram of a conventional optical communication network.

Communication networks use a variety of network elements to route signals from an originating point to a terminating point. One common network element is a switch, such as a COREDIRECTOR™ switch available from CIENA Corporation, that directs signals from one link (e.g., an optical fiber) to another. FIG. 1 depicts a portion of an exemplary optical communication network including terminals 10 and 12 optically communicating through switches A–D. Typically, switches have a plurality of inputs and a corresponding plurality of outputs. When a connection is requested from terminal 10 to terminal 12, switches A–D establish the connection.

Each switch A–D includes ingress ports and egress ports. The signal transmitted on the optical communication network is often time-division mutliplexed (TDM). Thus, there must be coordination between switches so that the signal is allocated to defined time slots. For example, for a signal to be transmitted from an egress port on switch A to an ingress port on switch B, switches A and B need to have the same time slot(s) available for this signal. Existing switches have the ability to change time slots within the switch, but between switches, the egress time slot and ingress time slot must match.

The process of establishing a connection from terminal 10 to terminal 12 is conventionally performed in two phases, namely a set-up phase and a connect phase. During set-up phase, the switches A–D make a rough determination of bandwidth availability based on congestion on the network. During the connect phase, the switches allocate time slots, create cross connects, and program the logical switch.

For example, assume a request for a connection is generated at terminal 10. During the set-up phase, switch A generates a set-up message flows from switch A to switch D. Each switch A–D checks for available bandwidth and issues a release message if the bandwidth is not available. No actual bandwidth allocation is performed during the set-up phase nor is there a determination of whether a pair of ports connected by a link has the same set of available time slots. The purpose of the set-up message is to make a rough determination of whether or not this connection can be admitted under the current network conditions.

If the set-up message is processed by all switches without a release message being generated, the connect phase is initiated and a connect message is sent from switch D to switch A. In the connect phase, each switch checks for the availability of matching time slots on a pair of ports connected by a link. As an example, switch D computes a set of available time slots at an ingress port and forwards these time slots to an egress port on switch C. Switch C, upon receiving these time slots, checks if these are available on the egress port. If this check succeeds, then the connect message is forwarded to an ingress port of switch C. If the ingress port of switch C has a set of available time slots (not necessarily the same time slots reserved at the egress port), switch C forwards these time slots to an egress port on switch B. Switch C also creates a cross connection (e.g., from egress port to ingress port), programs the logical switch, and saves this information. The connect phase continues until either a switch lacks available time slots, at which time the connection is not established, or the connection is established at all switches.

The existing process of establishing a connection suffers some drawbacks. One drawback is the possibility of creating a livelock situation if two switches are each trying to create connections on the same link. Consider, for example, the case when switch A and switch D are both trying to set up connections, one from switch A to switch D and another from switch D to switch A. Assume a first connect message from switch A reaches switch B at the same time as the second connect message from switch D reaches switch C. Switches B and C will attempt to reserve overlapping sets of time slots at which point both switches B and C receive release messages from one another. At this point, switch A and switch D are notified that the connection was not established and both switch A and switch D may again request a connection. This situation may repeat a number of times, resulting in a livelock situation. The livelock situation prevents establishment of connections and results in network signals being dropped.

Another drawback to the existing set-up and connect process is the creation of one-sided or orphan connections. A one-sided connection refers to a connection having only one endpoint. Referring to a connect message from switch D to switch A, if switch C proposes a set of time slots to switch B and some of these time slots are being occupied by a one-sided connection on switch B, then a livelock situation may arise where the connection request is repeatedly denied.

Another drawback to the existing set-up and connect process is the length of delay in releasing a connection request. Consider a situation where switch A has requested several connections involving the same link but the available capacity on the link allows at most one connection. During the set-up phase, all the requested connections will be admitted because there is no confirmation of bandwidth or of available time slots during the set-up phase. In the connect phase, however, all but one of the requested connections will be denied due to the bandwidth limit. It is preferable to deny requested connections promptly to limit delay in establishing the connection. Similarly, it is preferable to establish a connection as early as possible. The existing set-up and connect process does not expedite denying or establishing connections.

BRIEF DESCRIPTION OF THE DRAWINGS

Embodiments of the invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention.

The invention may be used in a variety of communication networks, including electrical and optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connection" and "operative connection" as used herein are relative terms and do not require a direct physical connection.

Figure 2:
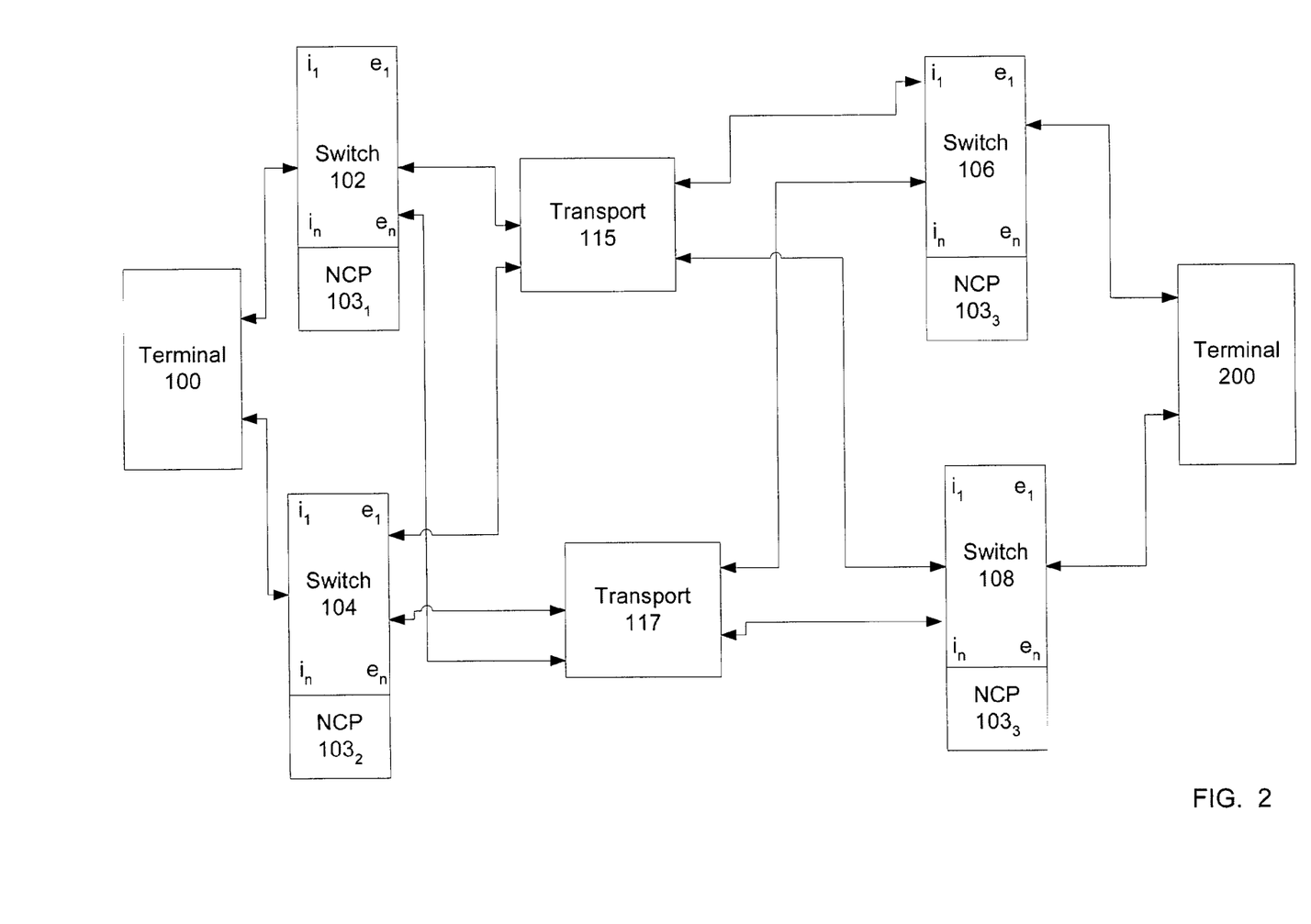
FIG. 2 is a block diagram of an optical communication network in an embodiment of the invention.

An embodiment of the invention is implemented in an optical communication network, although embodiments of the invention may be applied in other types of networks. FIG. 2 depicts a portion of an optical communication network in an exemplary embodiment of the invention. The network includes terminals 100 and 200 optically communicating through switches 102, 104, 106 and 108. Transport equipment 115 and 117 is used to transmit signals along the network. Transport equipment 115 and 117 may include long-haul transport equipment such as the CORESTREAM™ transport equipment available from CIENA Corporation. The transport equipment 115 and 117 may include components such as amplifiers, add/drop multiplexers, dispersion compensation modules, etc. In an exemplary embodiment, the transport equipment receives the TDM signals from switches 102–108 and arranges the TDM signals in a wavelength division multiplexed (WDM) format.

Switches 102–108 have a plurality of bi-directional inputs and outputs referred to as ingress ports and egress ports, respectively. Ingress ports $i_1$–$i_n$ and egress ports $e_1$–$e_n$ are illustrated on switches 102–108. When a connection is requested from terminal 100 to terminal 200, switches 102–108 establish the connection. It is understood that the network may have a mesh structure, with many paths connecting switches 102–108. The switches 102–108 are optically connected over links that may include optical fiber along with other components. As shown in FIG. 2, a switch may be coupled to multiple links at ingress ports $i_1$–$i_n$, and egress ports $e_1$–$e_n$.

Each switch 102–108 is an intelligent network element and performs signaling and routing functions through nodal control processors (NCP) $103_1$–$103_4$. Exemplary protocols for achieving this intelligence including the private network to node (PNNI) protocol and the optical routing and signaling protocols (OSRP), which is described in greater detail in co-pending U.S. patent application, Routing and Signaling in a SONET Network, filed Mar. 1, 1999, Ser. No. 09/259,263, the entire contents of which are incorporated herein by reference. Each NCP 103 may be implemented with one or more microprocessors implementing the functions described herein in response to a computer program in a storage medium.

Each NCP 103 executes a bandwidth pre-allocation process to provide for more rapid establishment of connections between terminals 100 and 200. The bandwidth pre-allocation process provides for a fast release of requested connections by determining whether bandwidth is available during the set-up phase. The bandwidth pre-allocation process creates provisional connections during a set-up phase and commits the provisional connections to actual connections during a connect phase. The benefit is that provisional connections may be rejected during the set-up phase thereby providing a fast release capability when compared to conventional techniques that require both the set-up and connect phase to release requests for connections.

Figure 3:
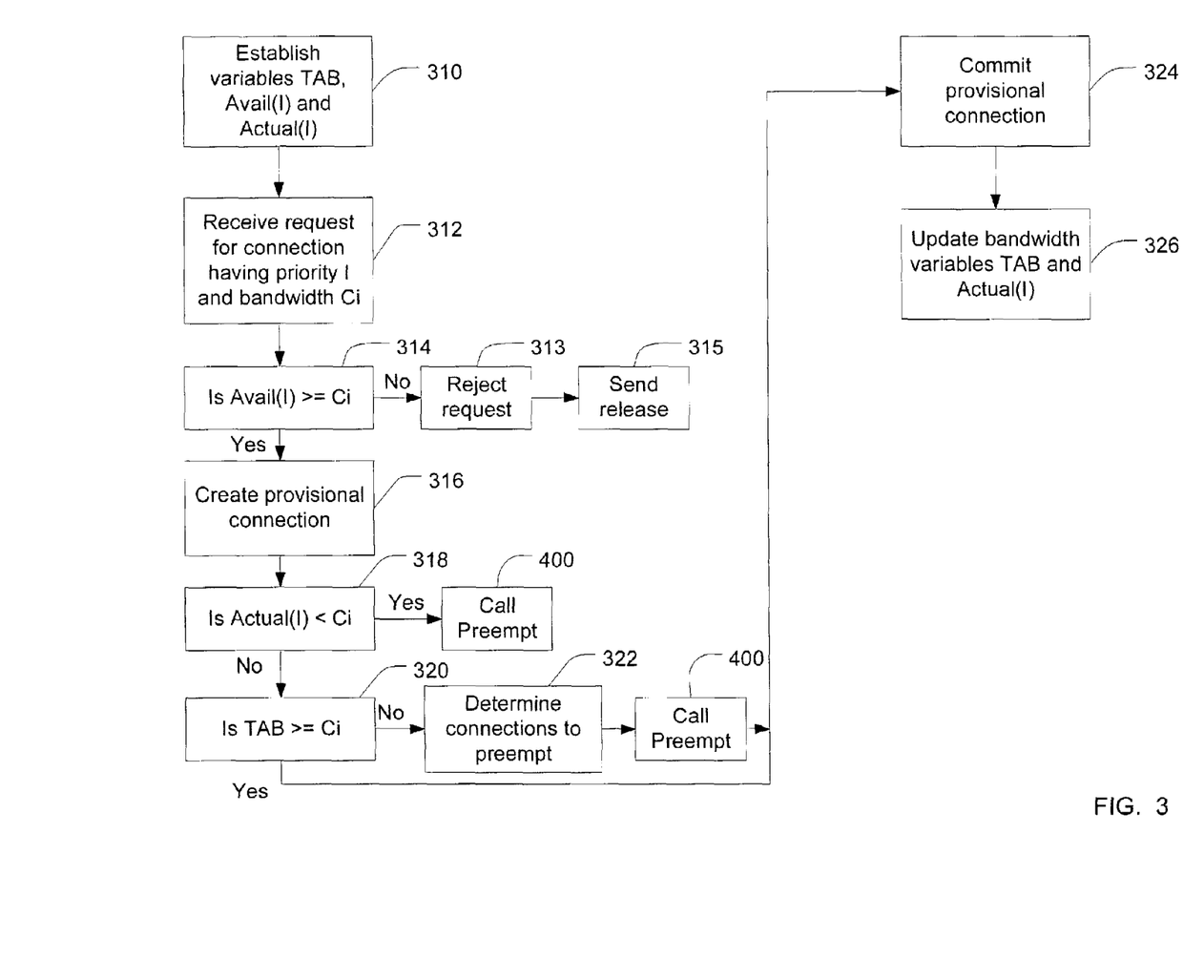
FIG. 3 is a flowchart of an exemplary process for an embodiment of the invention for allocating bandwidth during a set-up phase.

FIG. 3 is a flow chart of an exemplary bandwidth pre-allocation process. The process allows for creation of provisional connections during a set-up phase and committing actual connections during a connect phase. Each connection has an associated priority representing the importance of the connection. For example, a video conference connection may be assigned a high priority, whereas a connection for providing e-mail service may be assigned a lower priority. The priorities are used in the bandwidth allocation process to preempt or commit certain connections.

The process of handling requests for connections begins at step 310 by defining variables used to establish connections. Each switch 102–108 maintains variables indicating bandwidth on each link coupled to the switch at both the ingress ports and the egress ports. Variable TAB represents total available bandwidth for a link that is determined based on the total bandwidth of the link minus the total bandwidth of all actual connections, regardless of priority.

An available priority bandwidth variable, Avail(I), represents available bandwidth for a specific priority I, and is determined based on the total bandwidth of the link minus the total bandwidth of all provisional and actual connections of higher or equal priority. The available priority bandwidth variable is used in the set-up phase to provide the fast release function.

An actual priority bandwidth variable, Actual(I), represents actual bandwidth available for priority I, and is determined based on the total bandwidth of the link minus total bandwidth of all provisional and actual connections of higher priority plus total bandwidth of all actual connections of equal priority. The actual priority bandwidth variable is used in the connect phase to convert a provisional connection to an actual connection without preempting provisional or actual connections of higher priority or actual connections of equal priority. In an alternate embodiment, the actual priority bandwidth variable is also used during the set-up phase to release requests for connections.

Each switch 102–108 includes a listing of actual connections, including priority and bandwidth, and provisional connections, including priority and bandwidth. These listings are adjusted as connections are established and removed. Thus, each switch maintains the total available bandwidth, available priority bandwidth for each priority and actual priority bandwidth for each priority as connections are adjusted.

At step 312 a switch receives a set-up message requesting a connection having a requested priority I and a requested bandwidth Ci. At step 314, it is determined whether a provisional connection can be created based on whether the available priority bandwidth variable, Avail(I), for priority I is greater than or equal to the amount of requested bandwidth, Ci. If so, a provisional connection is created as shown at step 316 and bandwidth is allocated to this provisional connection. An alternate embodiment of the invention creates provisional connections based on the actual priority bandwidth variable, Actual(I), and is discussed in further detail herein.

If at step 314, there is insufficient available priority bandwidth, the request for a connection is rejected as shown at step 313. A release message is provided to the terminal requesting the connection as shown at step 315. Steps 310 through 315 provide the set-up phase for creating provisional connections. This rejection of a requested connection in the set-up phase provides a fast release functionality so that requested connections are rejected earlier in the connection process.

The set-up message is forwarded from one switch to the next until each switch in the path has either created a provisional connection or one switch has rejected the requested connection. If each switch has created a provisional connection, then the connect phase is initiated. In the connect phase, each switch attempts to commit the provisional connection to an actual connection. A connect message, including the requested bandwidth and the requested priority, is transmitted from one switch (e.g., the last switch to process the set-up message) to the next until either the actual connection is established across each switch or a switch rejects the actual connection.

Once the set-up phase is complete, flow proceeds to step 318 to begin the connect phase. In the connect phase, provisional connections may be committed as actual connections depending on bandwidth availability and priority. In the set-up phase, the bandwidth for the connection is reserved to create a provisional connection. In the connect phase, the bandwidth that was reserved for the provisional connection is committed to an actual connection by associating the connection with actual time slots.

At step 318, it is determined whether there is sufficient bandwidth to establish the actual connection by comparing the actual priority bandwidth variable for requested priority I, Actual(I), to the requested bandwidth, Ci. If Actual(I) is less than Ci then there is insufficient bandwidth to admit the requested connection without preempting a connection of higher priority or an actual connection of equal priority. If Actual(I) is less than Ci, then the provisional connection cannot be accepted and a preempt routine is called as shown at step 400. The preempt routine is described with reference to FIG. 4.

If sufficient actual priority bandwidth is available, the flow proceeds to step 320 where total available bandwidth, TAB, is compared to the requested bandwidth Ci. If the total available bandwidth is sufficient, then flow proceeds to step 324, where the provisional connection is committed as an actual connection. The total available bandwidth, TAB, and the actual priority bandwidth variable, Actual(I) are updated to reflect addition of an actual connection at step 326 and the process terminates. The total available bandwidth is decreased by Ci to reflect the creation of a new actual connection. The actual priority bandwidth variable, Actual (J) is increased by Ci for priorities J greater than or equal to I. This occurs because actual connections can preempt lower priority actual connections. Thus, the actual priority bandwidth variable is increased for both priority I (indicating the new actual connection) and priorities greater than I (indicating the ability to preempt the lower priority actual connection).

If at step 320 the total available bandwidth is insufficient, then flow proceeds to step 322 where it is determined which actual connections are to be preempted. To determine which existing connections are to be preempted, existing connections having a priority lower than the requested priority, I, are examined. The existing connections are arranged in a preemption candidate list in the order of ascending priorities and, within each priority, ascending bandwidth, until the sum of bandwidth of the connections in the preemption candidate list is equal to or larger than the requested bandwidth, Ci.

Connections are then removed from the preemption candidate list in the order of descending priorities and descending bandwidth until just before the sum of bandwidth of the connections in the preemption candidate list becomes smaller than the requested bandwidth, Ci. In other words, the sum of bandwidth of connections in the preemption candidate list is maintained equal to or above the requested bandwidth, Ci. Any remaining connections in the preemption candidate list are connections to be preempted determined at step 322. The process favors preempting smaller bandwidth and lower priority connections. Smaller connections have a better chances to be rerouted. Lower priority connections minimize the cascading effects. If lower priority connections can be preempted to free bandwidth for the requested connection, the connections are preempted at step 400 and the provisional connection committed to an actual connection at step 324.

Figure 4:
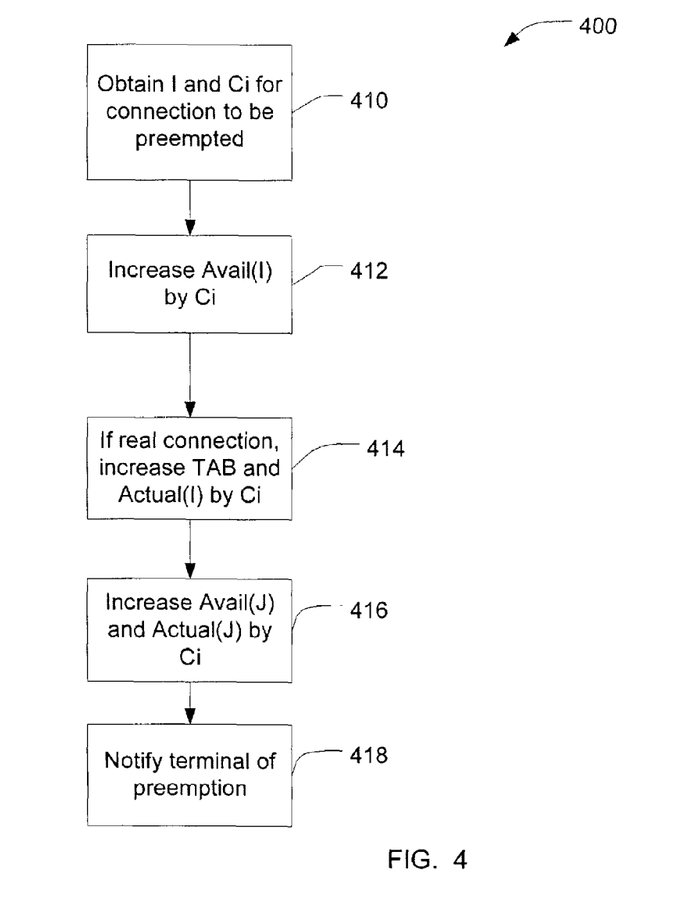
FIG. 4 is a flowchart of a routine for preempting connections for an embodiment of the invention.

FIG. 4 is a flowchart of the preempt routine. The process begins at step 410 where the priority, I, and the bandwidth, Ci, of the connection to be preempted are identified. At step 412, the available priority bandwidth variable, Avail(I), is increased by Ci. At step 414, if the preempted connection is an actual connection, then total available bandwidth, TAB, and the actual priority bandwidth variable, Actual(I), are increased by Ci. Both steps 412 and 414 reflect an increase in bandwidth that may be used by further connections.

At step 416 the available priority bandwidth variable, Avail(J), and the actual priority bandwidth variable, Actual (J), are increased by Ci for all priorities, J, greater than priority I, regardless of whether the preempted connection is actual or provisional. Because higher priority connections can preempt lower priority connections, the available priority bandwidth variable, Avail(J), and the actual priority bandwidth variable, Actual(J), for these higher priority connections are increased. At step 418, terminals 100 and 200 are notified of the preemption of the connection by sending a release message to each terminal.

Figure 5:
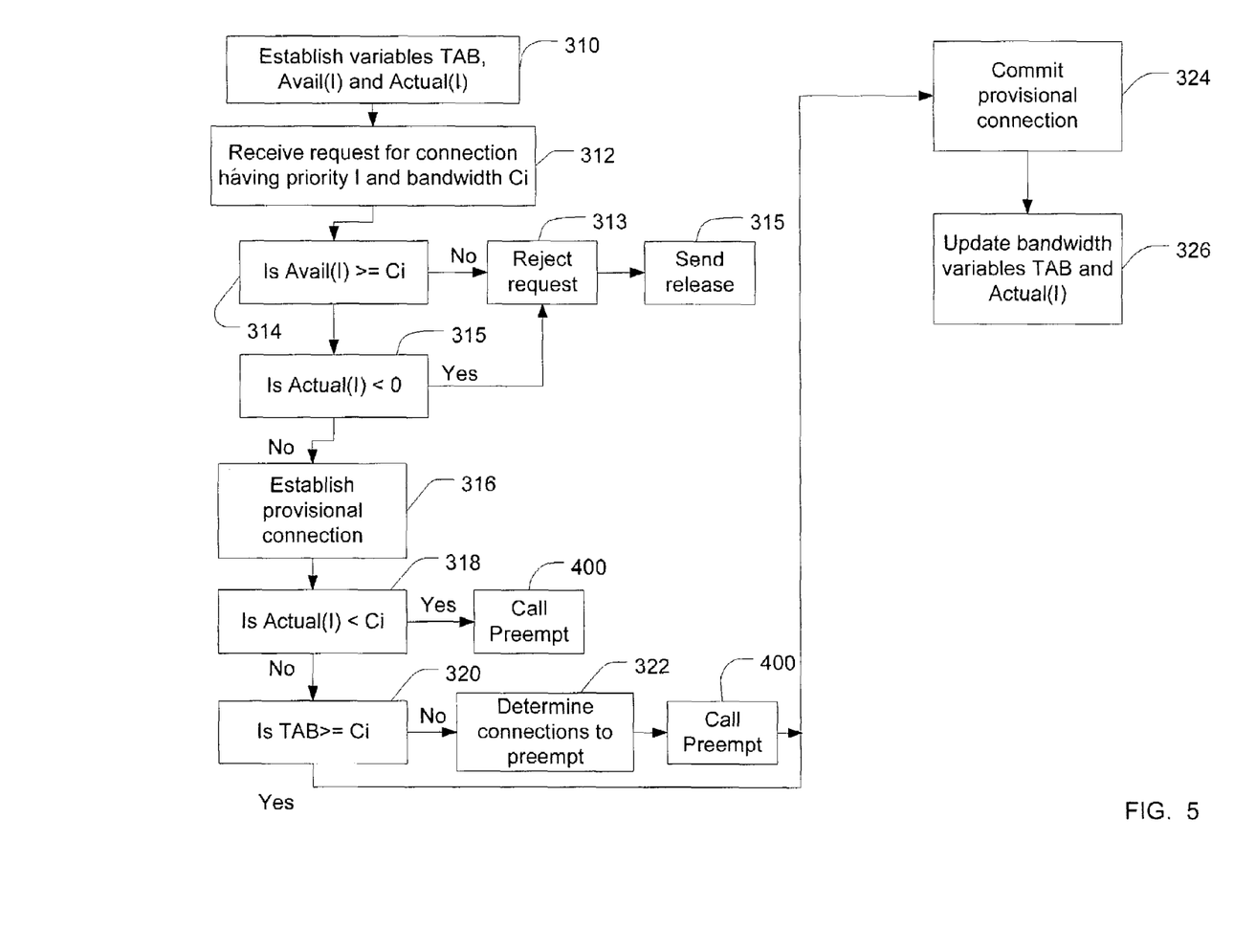
FIG. 5 is a flowchart of an alternate process for allocating bandwidth during a set-up phase for an embodiment of the invention; and, FIGS. 6 and 7 are flowcharts of a time slot allocation process for allocating time slots for an embodiment of the invention.

FIG. 5 is a flowchart of an exemplary connection handling process in an alternate embodiment of the invention. The process is similar to that of FIG. 3 with the inclusion of step 315 where actual priority bandwidth variable for priority I, Actual(I), is evaluated to determine whether bandwidth for the requested priority is available. If Actual(I) is less than zero, then the requested connection cannot be admitted without preempting an existing provisional or actual connections of higher priority or actual connections of equal priority. In the embodiment of FIG. 5, such requested connections are rejected at step 315 during the set-up phase thereby expediting the release.

The bandwidth allocation processes described herein provide for a fast release of requests for connections during the set-up phase. This prevents prolonged processing of connection requests through both the set-up phase and connect phase, only to have the requested connection refused in the connect phase.

Another feature of the invention is a timeslot pre-allocation process that identifies available time slots between switches during the set-up phase. The NCPs 103 may execute the time slot pre-allocation in conjunction with the bandwidth pre-allocation to expedite release of requested connections. Exemplary processes are shown in the flowcharts of FIG. 6 and FIG. 7 for embodiments of the invention.

Figure 6:
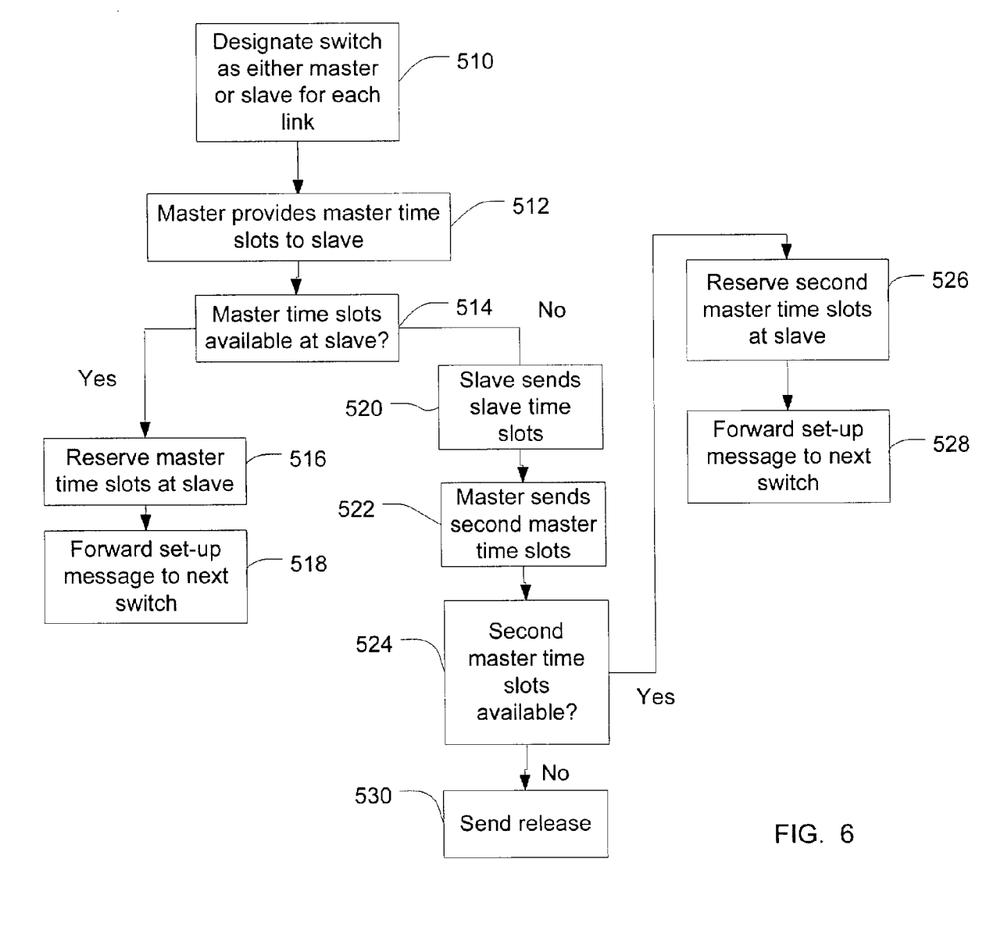
Figure 7:
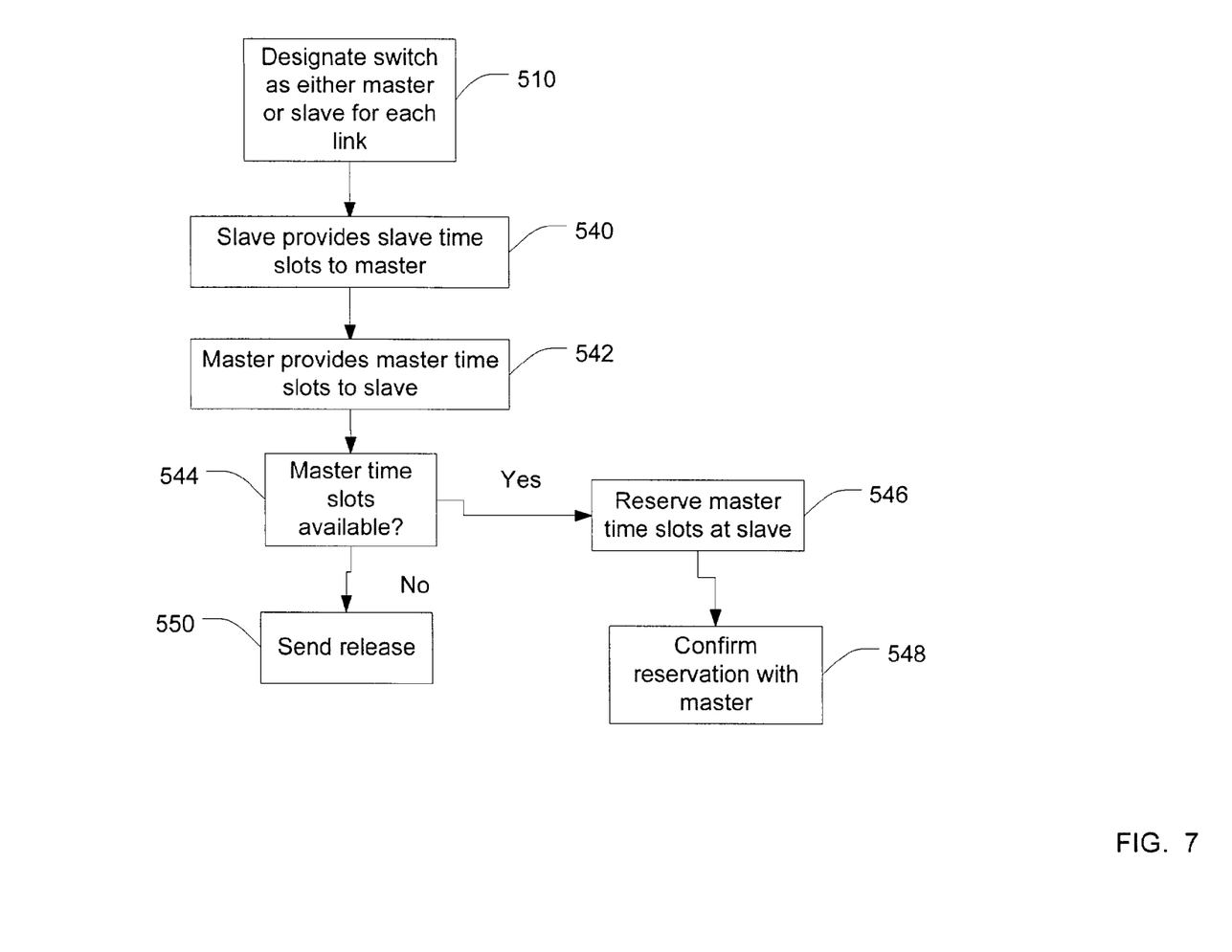

FIG. 6 is directed to a situation where a master switch is forwarding a set-up message to a slave switch. The process begins at step 510 where, upon initialization of the switches 102–108, each switch is designated as either a master or a slave with respect to each link in the network. For example, referring to FIG. 2, upon initialization, the NCPs 103 in switches 102–108 determine which switch is designated master and which switch is designated slave for each link in the network. As described further, the master switch has final control for designating time slots.

During the set-up phase, the master switch reserves a set of master time slots and forwards the master time slots to the slave switch as part of the set-up message as shown at step 512. At step 514, the slave switch determines if the master time slots are available and, if so, flow proceeds to step 516 where the master time slots are reserved by the slave switch. The set-up message is forwarded to the next switch at step 518.

If at step 514, the slave switch determines that at least one of the master time slots is not available, the slave switch sends a set of available slave time slots to the master switch as shown at step 520. The master switch reserves a second set of master time slots and forwards these second master time slots to the slave at step 522. At step 524, the slave switch determines if the second master time slots are available and, if so, flow proceeds to step 526 where the second master time slots are reserved by the slave switch. The set-up message is forward to the next switch at step 528. If at least one second master time slot cannot be reserved by the slave switch, then the process terminates at step 530 with the slave switch sending a release message to the master switch indicating that the connection cannot be established, thereby terminating the set-up phase.

FIG. 7 depicts a process when a slave switch forwards a set-up message to a master switch. The process begins at step 510 where, upon initialization of the switches 102–108, each switch is designated as either a master or a slave with respect to each link in the network. At step 540, the slave switch sends slave timeslots to the master switch. At step 542, the master switch reserves a set of time slots, available to both the master switch and the slave switch, and sends the master time slots to the slave switch. At 544, the slave switch determines whether the master time slots are available. If so, the slave switch reserves the master time slots at step 546 and confirms reservation with the master switch at 548. The master switch can then forward the set-up message to the next switch or terminal. If the master time slots are not available at step 544, the slave switch sends a release message to the master switch at step 550 and the set-up process is terminated.

The time slot allocation process resolves race conditions where two set-up messages traveling in opposite directions contend for the same link. For example, consider a set-up message from switch 102 towards switch 106 and another set-up message from switch 106 towards switch 102. In the above time slot allocation process, the set-up message that reaches the master switch first will have the priority over the other requested connection. The time slot allocation process also provides for a fast release of set-up messages during the set-up phase due to a lack of time-slot correspondence between two switches. Again, the fast release function is preferable when compared to conventional techniques that do not release requested connections until the connect phase.

Another approach to assigning time slots where switches are designated as master or slave is for each switch to allocates time slots in different orders depending on whether a master switch or a slave switch is forwarding the set-up message. A master switch sending a set-up message may specify time slots selected from a first group of time slots and a slave switch sending a set-up message may specify time slots selected from a second group of time slots. For example, the time slots may be assigned numerical references. If a set-up message is sent from a master switch to a slave switch, then higher numbered time slots are used. Alternatively, if the setup is going from a slave switch to a master switch, then the lower numbered time slots are used. This arrangement may be reversed so that the master switch specifies lower numbered time slots and the salve switch specifies higher numbered time slots.

In an alternate embodiment, switches are not designated as master or slave but there is communication between the switches during the set-up phase concerning time slot availability. The set-up message includes a list of available time slots. The receiving switch reserves the time slots, if available, and forwards the set-up message. Alternatively, if the time slots are not available, the receiving switch sends a release message to the originating switch thereby terminating the set-up phase.

Although the invention has been described with reference to optical networks, the process of allocating bandwidth may be implemented on other types of networks including networks carrying electrical signals, wireless networks, etc. Additionally, the invention may be applied in networks where optical signals are converted to electrical signals and then back to optical signals.

The processing performed to implement the bandwidth pre-allocation and time slot pre-allocation may be implemented by one or more processors on one or more switches. Thus, the invention may be embodied in the form of a computer program code including instructions embodied in tangible media, such as floppy diskettes, CD-ROMs, hard drives, memory or any other computer-readable storage medium, wherein, when the computer program code is loaded into and executed by a processor, the processor becomes an apparatus for practicing an embodiment of the invention. Also included may be embodiments in the form of computer program code, for example, whether stored in a storage medium, loaded into and/or executed by a processor, or as a data signal transmitted, whether a modulated carrier wave or not, over some transmission medium, such as over electrical wiring or cabling, through fiber optics, or via electromagnetic radiation, wherein, when the computer program code is loaded into and executed by a processor, the processor becomes an apparatus for practicing the embodiment of the invention. When implemented on a general-purpose microprocessor, the computer program code segments configure the microprocessor to create specific logic circuits.

The invention being thus described, it will be obvious that the same may be varied in many ways. Such variations are not to be regarded as departure from the spirit and scope of the invention, and all such modifications as would be obvious to one skilled in the art are intended to be included within the scope of the invention.

What is claimed is:

1. A method of allocating bandwidth in a communication network including a plurality of switches, the method comprising:
   during a set-up phase:
   receiving a set-up message at a first switch, the set-up message requesting a connection having a requested bandwidth and a requested priority;
   the first switch generating a release message rejecting the requested connection if available priority bandwidth for the requested priority is less than the requested bandwidth;
   the first switch creating a provisional connection corresponding to the requested connection if the available priority bandwidth for the requested priority is greater than or equal to the requested bandwidth; and
   the first switch forwarding the set-up message to a second switch if the available priority bandwidth for the requested priority is greater than or equal to the requested bandwidth;
   during a connect phase:
   the first switch receiving a connect message from the second switch, the connect message requesting an actual connection having the requested bandwidth and the requested priority;
   the first switch committing the provisional connection to the actual connection if actual priority bandwidth for the requested priority is greater than or equal to the requested bandwidth; and
   the first switch preempting the provisional connection if the actual priority bandwidth for the requested priority is less than the requested bandwidth.

2. The method of claim 1 wherein:
said first switch committing the provisional connection to the actual connection includes comparing a total available bandwidth to the requested bandwidth, the first switch committing the provisional connection to the actual connection if the total available bandwidth is greater than or equal to the requested bandwidth.

3. The method of claim 2 wherein:
said first switch committing the provisional connection to the actual connection includes preempting connections having a priority lower than the requested priority if the total available bandwidth is less than the requested bandwidth.

4. The method of claim 3 wherein:
said preempting connections having a priority lower than the requested priority includes preempting connections having a lowest relative priority and a lowest relative bandwidth.

5. The method of claim 4 wherein:
said preempting connections having a priority lower than the requested priority includes arranging connections having a priority less than the requested priority in order of descending priority and descending bandwidth in a preemption candidate list;
removing connections from the preemption candidate list such that the sum of bandwidth of connections in the preemption candidate list is greater than the requested bandwidth; and
preempting connections remaining on the preemption candidate list.

6. The method of claim 5 wherein:
said preempting connections remaining on the preemption candidate list includes preempting a connection having a preempted priority and a preempted bandwidth and updating the available priority bandwidth for the preempted priority by an amount equal to the preempted bandwidth.

7. The method of claim 6 wherein:
said preempting connections remaining on the preemption candidate list includes updating the available priority bandwidth for a priority higher than the preempted priority by an amount equal to the preempted bandwidth.

8. The method of claim 1 wherein:
said first switch preempting the provisional connection includes updating the available priority bandwidth for the requested priority by an amount equal to the requested bandwidth.

9. The method of claim 8 wherein:
said first switch preempting the provisional connection includes updating the available priority bandwidth for a priority higher than the requested priority by an amount equal to the requested bandwidth.

10. The method of claim 1 wherein:
said first switch creating the provisional connection corresponding to the requested connection includes creating the provisional connection if actual priority bandwidth for the requested priority is greater than or equal to zero.

11. A communication network comprising:
a first switch directing signals on the communication network;
a second switch in communication with said first switch, said second switch directing signals on the network;
during a set-up phase:
   said first switch receiving a set-up message, the set-up message requesting a connection having a requested bandwidth and a requested priority;
   said first switch generating a release message rejecting the requested connection if available priority bandwidth for the requested priority is less than the requested bandwidth;
   said first switch creating a provisional connection corresponding to the requested connection if the available priority bandwidth for the requested priority is greater than or equal to the requested bandwidth; and
   said first switch forwarding the set-up message to said second switch if the available priority bandwidth for the requested priority is greater than or equal to the requested bandwidth;
during a connect phase:
   said first switch receiving a connect message from said second switch, the connect message requesting an actual connection having the requested bandwidth and the requested priority;
   said first switch committing the provisional connection to the actual connection if actual priority bandwidth for the requested priority is greater than or equal to the requested bandwidth; and
   said first switch preempting the provisional connection if the actual priority bandwidth for the requested priority is less than the requested bandwidth.

12. The network of claim 11 wherein:
said first switch committing the provisional connection to the actual connection includes comparing a total available bandwidth to the requested bandwidth, said first switch committing the provisional connection to the actual connection if the total available bandwidth is greater than or equal to the requested bandwidth.

13. The network of claim 12 wherein:

said first switch committing the provisional connection to the actual connection includes preempting connections having a priority lower than the requested priority if the total available bandwidth is less than the requested bandwidth.

14. The network of claim 13 wherein:

said preempting connections having a priority lower than the requested priority includes preempting connections having a lowest relative priority and a lowest relative bandwidth.

15. The network of claim 14 wherein:

the preempting connections having a priority lower than the requested priority includes arranging connections having a priority less than the requested priority in order of descending priority and descending bandwidth in a preemption candidate list;

removing connections from the preemption candidate list such that the sum of bandwidth of connections in the preemption candidate list is greater than the requested bandwidth; and preempting connections remaining on the preemption candidate list.

16. The network of claim 15 wherein:

the preempting connections remaining on the preemption candidate list includes preempting a connection having a preempted priority and a preempted bandwidth and updating the available priority bandwidth for the preempted priority by an amount equal to the preempted bandwidth.

17. The network of claim 16 wherein:

the preempting connections remaining on the preemption candidate list includes updating the available priority bandwidth for a priority higher than the preempted priority by an amount equal to the preempted bandwidth.

18. The network of claim 11 wherein:

said first switch preempting the provisional connection includes updating the available priority bandwidth for the requested priority by an amount equal to the requested bandwidth.

19. The network of claim 18 wherein:

said first switch preempting the provisional connection includes updating the available priority bandwidth for a priority higher than the requested priority by an amount equal to the requested bandwidth.

20. The network of claim 11 wherein:

said first switch creating the provisional connection corresponding to the requested connection includes creating the provisional connection if actual priority bandwidth for the requested priority is greater than or equal to zero.

21. A method of allocating time slots between a first switch and a second switch in a communication network carrying time division multiplexed signals, the method comprising:

designating one of the first switch and the second switch as a master switch;

designating the other of the first switch and the second switch as a slave switch;

the master switch providing a set-up message including a master time slot to the slave switch;

the slave switch determining if the master time slot is available at the slave switch; and if the master time slot is available at the slave switch, the slave switch reserves the master time slot for communication with the master switch and forwards the set-up message to a further switch.

22. The method of claim 21 further comprising:

if the master time slot is not available at the slave switch, the slave switch sends a release message to the master switch terminating the set-up message.

23. The method of claim 21 further comprising:

if the master time slot is not available at the slave switch, the slave switch sends a slave time slot to the master switch; and the master switch sending a second master time slot to the slave switch in response to the slave time slot.

24. The method of claim 23 wherein:

if the second master time slot is available at the slave switch, the slave switch reserves the second master time slot for communication with the master switch and forwards the set-up message to a further switch.

25. The method of claim 23 further comprising:

if the second master time slot is not available at the slave switch, the slave switch sends a release message to the master switch terminating the set-up message.

26. A communication network carrying time division multiplexed signals, the network comprising:

a first switch directing signals on the communication network;

a second switch in communication with said first switch, said second switch directing signals on the network;

one of said first switch and said second switch being designated as a master switch;

the other of said first switch and said second switch as a slave switch;

said master switch providing a set-up message including a master time slot to said slave switch;

said slave switch determining if the master time slot is available at said slave switch; and if the master time slot is available at said slave switch, said slave switch reserves the master time slot for communication with said master switch and forwards the set-up message to a further switch.

27. The method of claim 26 further comprising:

if the master time slot is not available at said slave switch, said slave switch sends a release message to said master switch terminating the set-up message.

28. The method of claim 26 further comprising:

if the master time slot is not available at said slave switch, said slave switch sends a slave time slot to said master switch; and said master switch sending a second master time slot to said slave switch in response to the slave time slot.

29. The method of claim 28 wherein:

if the second master time slot is available at said slave switch, said slave switch reserves the second master time slot for communication with said master switch and forwards the set-up message to a further switch.

30. The method of claim 28 further comprising:

if the second master time slot is not available at said slave switch, said slave switch sends a release message to said master switch terminating the set-up message.

* * * * *